United States Patent [19]

Takagi et al.

[11] Patent Number: 5,262,905
[45] Date of Patent: Nov. 16, 1993

[54] MONITOR APPARATUS FOR ROTARY HEAD

[75] Inventors: Ryuji Takagi, Kanagawa; Masato Tanaka, Tokyo; Hisao Nishioka, Chiba, all of Japan

[73] Assignee: Sony Corporation, Tokyo, Japan

[21] Appl. No.: 623,498

[22] Filed: Dec. 7, 1990

[30] Foreign Application Priority Data

Dec. 7, 1989 [JP] Japan ................................. 1-318351

[51] Int. Cl.$^5$ ............................................. G11B 33/10
[52] U.S. Cl. ......................................... 360/53; 360/70; 360/77.13; 369/53; 369/43
[58] Field of Search ................... 360/53, 70, 77.13; 369/43, 53

[56] References Cited

U.S. PATENT DOCUMENTS 4,380,068  4/1983  de Couasnon ...................... 371/5.1
5,113,397  5/1992  Kaaden et al. ...................... 360/53

OTHER PUBLICATIONS

Patent Abstracts Of Japan vol. 9, No. 285 (P-404) Nov. 12, 1985.
Patent Abstracts Of Japan vol. 7, No. 070 (P-185) Mar. 23, 1983.

*Primary Examiner*—Joseph L. Dixon
*Assistant Examiner*—David L. Robertson
*Attorney, Agent, or Firm*—Lewis H. Eslinger; Jay H. Maioli; Donald S. Dowden

[57] ABSTRACT

The scanning locus of a rotary head type recording and reproducing apparatus is evaluated by reproducing a tape having a number of oblique recording tracks. Respective track addresses are assigned to each track, and each track includes a number of block addresses. The track address and block address reproduced at a given time are supplied to an address map data storage device to generate in the address map data storage device a set of map information indicative of the scanning conditions of the rotary heads. This makes it possible to determine easily whether the reproducing conditions along the scanning locus with respect to the recording track are good or bad.

13 Claims, 6 Drawing Sheets

MONITOR APPARATUS FOR ROTARY HEAD

BACKGROUND OF THE INVENTION

1. Field of the Invention

The present invention relates to apparatus for evaluating a scanning locus and, more particularly, to such apparatus suitable for use in evaluating the scanning locus traced by rotary heads with respect to recording tracks obliquely formed on a tape.

2. Description of the Prior Art

Figure 1:
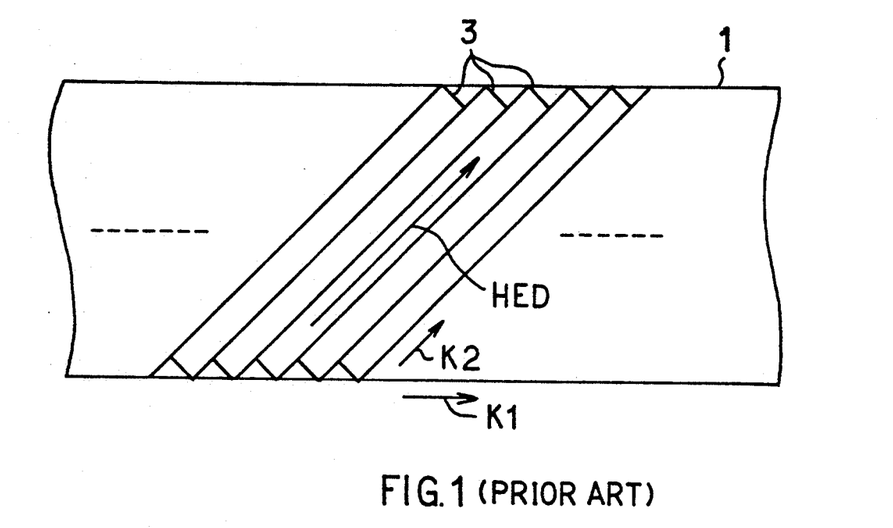
FIG. 1 and FIG. 2 are schematic diagrams and FIGS. 3A and 3B are signal waveform diagrams used for explaining prior art apparatus for evaluating scanning locus.

Conventionally, in a rotary head type digital audio tape recorder (a so-called R-DAT), a magnetic tape used as a recording medium is obliquely lapped around a rotary drum having rotary magnetic heads mounted thereon. The tape is caused to travel in a direction K1, as FIG. 1 shows. While the magnetic tape travels in the direction K1, the rotary magnetic heads scan the magnetic tape 1 in a head scanning direction K2 that forms an acute angle with the direction K1. The rotary magnetic heads obliquely traverse the magnetic tape 1, whereby oblique recording tracks 3 are formed on the tape successively connected to one another in the tape traveling direction K1.

In a rotary head type recording and reproducing apparatus of the type described above, there is a possibility of a malfunction occurring in recording and reproducing an information signal on the recording tracks 3 if the drive system causing the magnetic tape 1 to travel around the magnetic drum, i.e., the tape path system, does not work correctly. Therefore, it becomes necessary to evaluate the tape path system to determine whether it is "good" or "bad." This can be done, for example, during the process of fabricating the rotary head type recording and reproducing apparatus by closely inspecting the operating conditions of the tape path system, such as the contacting condition of the rotary magnetic head with respect to the tape, the contacting width of the rotary magnetic head, possible meandering of the recording tracks, etc.

In a conventional method for evaluating the tape path system, a signal is recorded in recording tracks 3 formed on a tape 1 in a recording mode, and the recorded signal is picked up in a reproducing mode from the recording tracks 3. The envelope waveform of the picked-up signal is displayed on the screen of an oscilloscope, and the envelope is visually examined by an inspector to determine the existence of any abnormalities.

Figure 2:
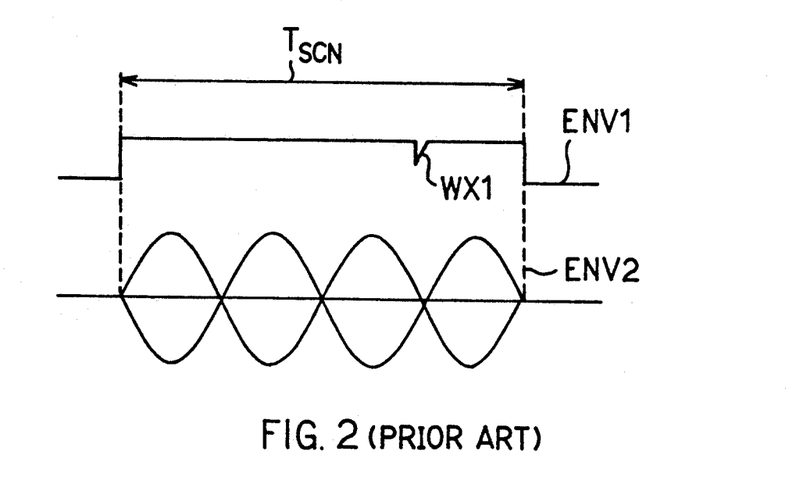

More specifically, in the case where the rotary head type recording and reproducing apparatus to be inspected is of a tracking control type, i.e., a type in which the rotary magnetic head is tracking-controlled to follow the recording track 3 in the reproducing mode, the scanning locus HED of the rotary magnetic head is traced on the recording track 3 as shown in FIG. 1, whereby an envelope waveform ENV1 continuously held virtually at a constant level during a scanning period $T_{SCN}$ of the rotary magnetic head is normally displayed on the screen of the oscilloscope as shown by ENV1 in FIG. 2. If an abrupt change in the envelope waveform ENV1 is found, as indicated at WX1, the tape path system is evaluated to be faulty at a scanning position corresponding to the location of the abrupt change.

Figure 3A:
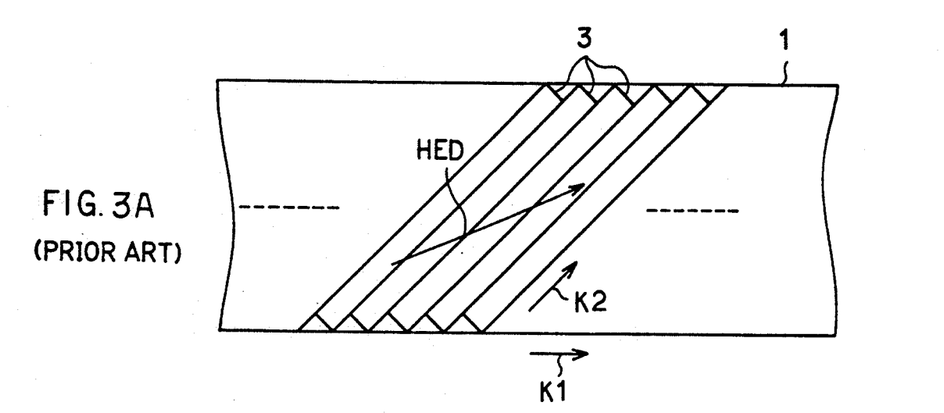
Figure 3B:
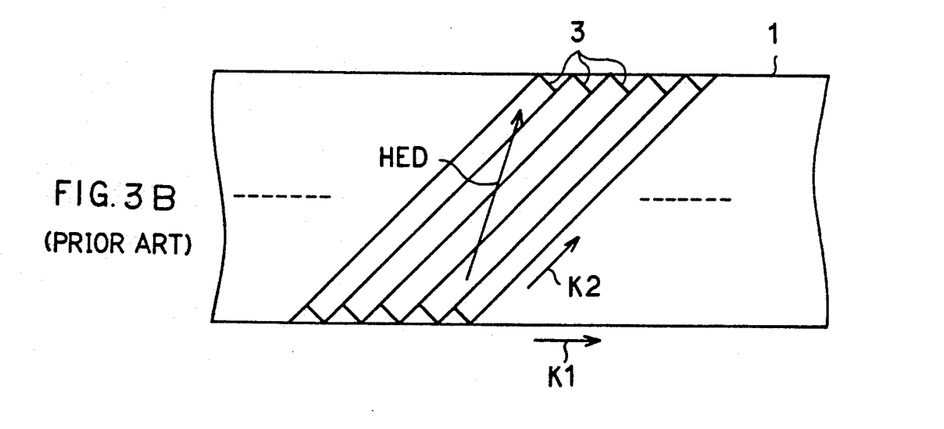

On the other hand, if the rotary head type recording and reproducing apparatus is of a type in which the rotary magnetic head, in the reproducing mode, is not tracking-controlled to follow the recording track 3 (which system is called a non-tracking system), and if the scanning angle of the rotary magnetic head with respect to the recording track 3 deviates from that in the recording mode, the scanning locus HED of the rotary magnetic head intersects the recording tracks 3 as shown in FIG. 3A or FIG. 3B. As a result, an envelope waveform as shown by ENV2 in FIG. 2, the so-called "barreled" envelope waveform ENV2, in which the level of the envelope waveform diminishes when the scanning locus HED shifts from one recording track 3 to the next recording track 3, is displayed.

In practice, it is often difficult to tell by observation of an oscilloscope whether or not there is a defect in the envelope waveform and whether or not the scanning angle of the rotary magnetic head is proper with respect to the recording track 3.

OBJECTS AND SUMMARY OF THE INVENTION

In view of the foregoing, an object of this invention is to provide a remedy for the problems of the prior art outlined above. In particular, an object of the invention is to provide apparatus for evaluating a scanning locus and easily and accurately determining the existence of an abnormality in a tape path system.

The foregoing and other objects are attained in accordance with the invention by the provision of apparatus for evaluating a scanning locus of a rotary head with respect to tracks recorded obliquely on a tape, the apparatus comprising rotary head type recording and reproducing means for recording tracks obliquely on a tape, the tracks being assigned respective track addresses and each track comprising a plurality of blocks assigned respective block addresses, and for reproducing the track and block address proper to each block; detecting means responsive to the recording and reproducing means for indicating as to each track and block address whether or not there has been correct reproduction by the reproducing means; address map data storage means responsive to the recording and reproducing means and the detecting means for storing the reproduced track and block addresses as respective first and second nap position specifying data and for generating map information indicating the positions specified by the correctly reproduced track and block addresses and identifying any track and block addresses that have not been correctly reproduced; and evaluating means responsive to the address map data storage means for evaluating the scanning locus.

The nature, principle and utility of the invention will become more apparent from the following detailed description when read in conjunction with the accompanying drawings, in which like parts are designated by like reference characters.

DESCRIPTION OF THE PREFERRED EMBODIMENTS

Preferred embodiments of this invention will be described with reference to the accompanying drawings.

1. First Embodiment

Figure 4:
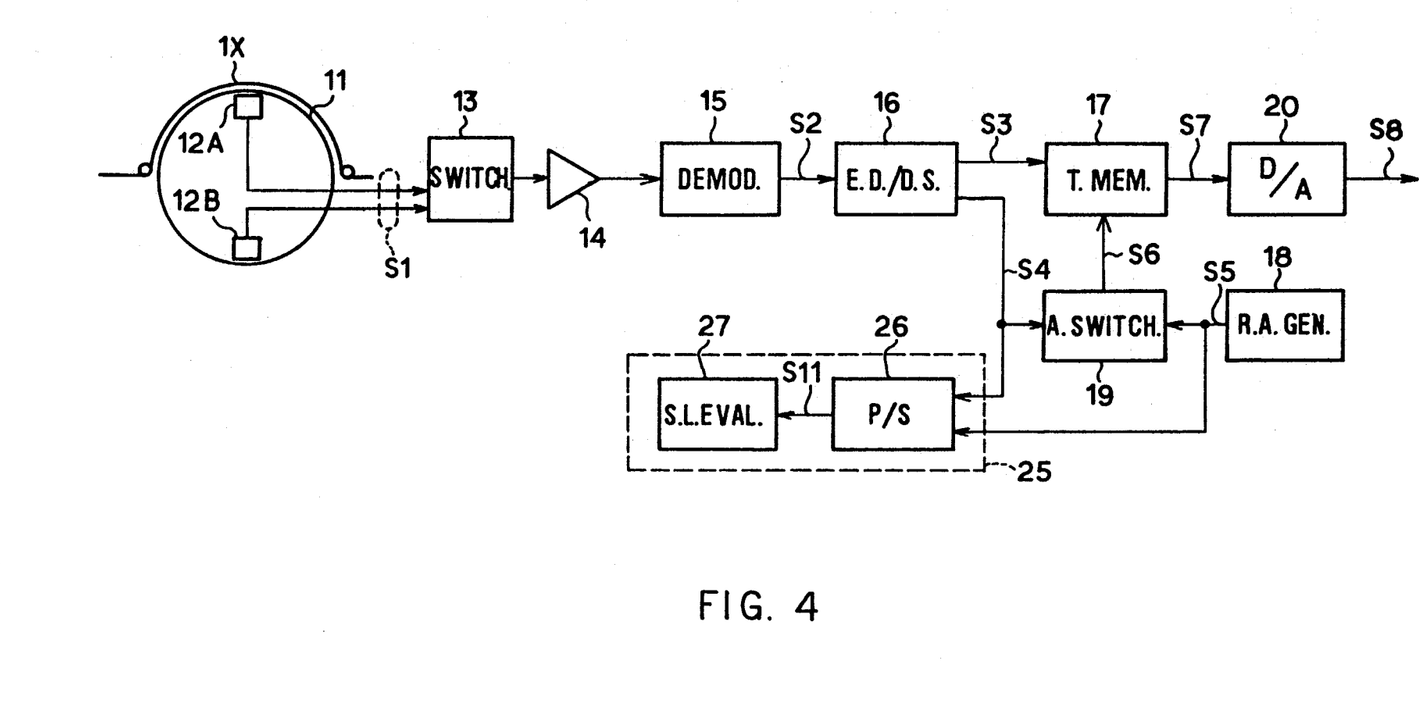
FIG. 4 is a block diagram showing an embodiment of apparatus for evaluating a scanning locus according to the present invention.
Figure 5:
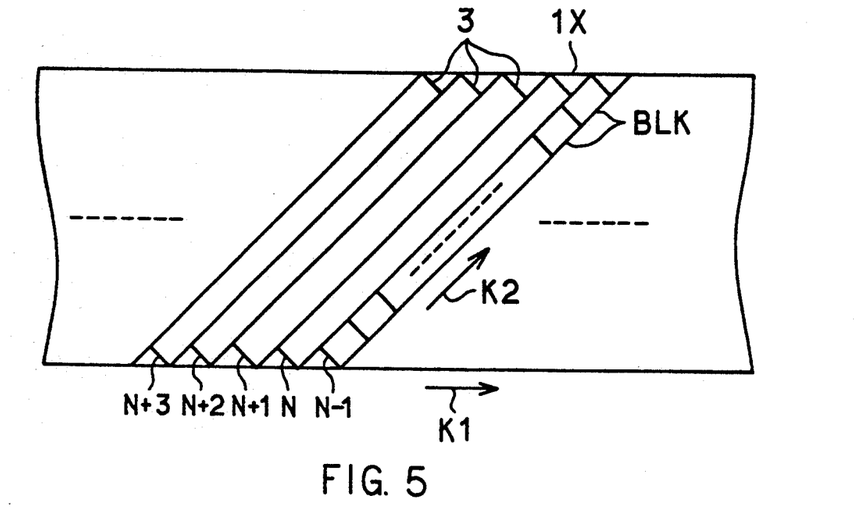
FIG. 5 is a schematic plan view showing a scanning locus on a magnetic tape used in the apparatus of FIG. 4.

In FIG. 4 and FIG. 5, parts corresponding to those in FIG. 1 are denoted by the same reference characters. A magnetic evaluation tape 1X is loaded into a rotary head type recording and reproducing apparatus to be inspected. A pickup signal S1 obtained from rotary magnetic heads 12A and 12B mounted on a rotary drum 11 (FIG. 4) is successively passed through a switching circuit 13 and a reproduction amplifier circuit 14 and acquired by a demodulation circuit 15.

Figure 6:
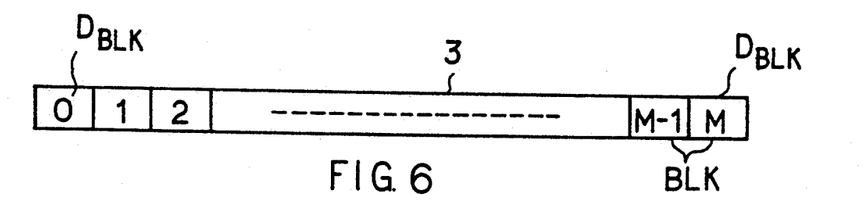
FIG. 6 is a diagram used for explaining block data represented in FIG. 5.

Each of the recording tracks 3 (FIG. 5) formed on the magnetic tape 1X for evaluation is divided into (M+1) blocks BLK, to which a sequence of block addresses m="0", "1", ..., "M" are assigned along the head scanning direction K2 as shown in FIG. 6. The recording tracks 3 are assigned track addresses n=..., n−1, n, n+1, ... one after another along the tape traveling direction K1.

Block data $D_{BLK}$ in each block BLK comprises information data, track address data assigned to the recording track 3 to which the block BLK belongs, block address data assigned to the block BLK, and error correcting code data consisting of a CRC code (cyclic redundancy check code). As the block data $D_{BLK}$ of each block BLK is picked up by the rotary magnetic heads 12A and 12B, the information data, the track address data, and the block address data are reproduced for each block BLK as a demodulated output S2 (FIG. 4) of the demodulation circuit 15.

The demodulation output S2 is separated into information data S3 and a write address signal S4 in an error detection and data separation circuit 16. The information data S3 is supplied to a temporary memory 17. The write address S4, together with a read address signal S5 from ready address generation circuit 18, is supplied, through an address switching circuit 19, to the temporary memory 17 as an address signal S6.

Figure 7:
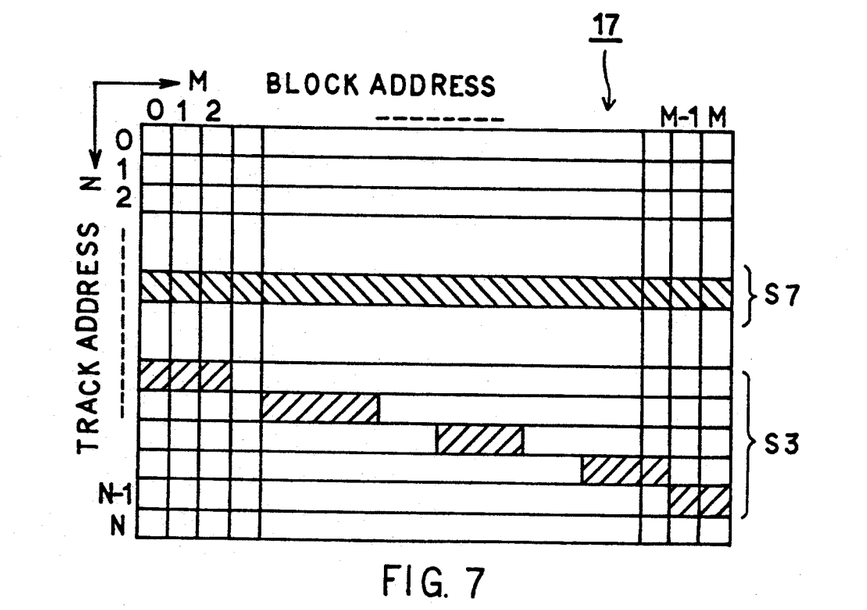
FIG. 7 is a schematic diagram used for explaining an address structure of a temporary memory 17 shown in FIG. 4.

As FIG. 7 shows, the temporary memory 17 has memory area rows of which each stores data on one track specified by the track address n(="0", "1", "2", ..., "N"). Each memory area row at the track address n specifies the memory area to which the block address m(="0", "1", "2", ..., "M") is assigned.

Thus, the temporary memory 17 (FIG. 4) is adapted to write the information data S3 into the memory areas specified by the track addresses n and block addresses m constituting the write address signal S4.

The information data S3 thus written in are sequentially read out according to the block addresses m(="0", "1", "2", ..., "M") when the track addresses n(="0", "1", "2", ..., "N") are sequentially specified by the read address signal S5. The latter signal is supplied, as the address S6, from the address switching circuit 19, and the read out data S7 is passed through a digital/analog converter 20 and delivered as an output signal S8.

In the described arrangement, the error detection and data separation circuit 16, in the reproducing mode, performs, upon receipt of the demodulated output S2 obtained at the output terminal of the demodulation circuit 15, data reproduction processing. This processing includes error correction processing of information data picked up from each recording track 3 and handling the block data $D_{BLK}$ obtained from each block BLK as a unit. The error detection and data separation circuit 16 thereby provides the information data S3 and the write address signal S4 formed of the track address data and the block address data.

As a result, the reproduced data are written into the temporary memory 17, the block data $D_{BLK}$ of each block BLK being handled as a unit.

In the case where the rotary head type recording and reproducing apparatus intended to be inspected is of the tracking system described above with reference to FIG. 1, the scanning loci HED are traced on the recording tracks 3 at the track addresses n(=..., n−1, n, n+1, ...). The block data $D_{BLK}$ are thus reproduced in the sequence of the block addresses m(="0", "1", "2", ..., "M").

On the other hand, when the rotary head type recording and reproducing apparatus is of the non-tracking system described above with reference to FIG. 3A and FIG. 3B, the scanning locus HED is traced so as to intersect plural recording tracks 3, but since the rotary magnetic heads 12A and 12B are adapted to rotate at such a rotating speed as to scan the tape with a reproduction density two times as high as the recording density on the recording track 3 in the recording mode, the rotary magnetic heads 12A and 12B can perform the scanning without dropping any of the blocks BLK formed on the magnetic tape 1X.

The reproduced data written in the temporary memory 17 as described above can be read out in the order of the track addresses n(="0", "1", "2", ..., "N") i.e., the order of the recording along the recording tracks 3) in accordance with the read address signal S5 delivered from the read address generation circuit 18. Thus the information data written on the magnetic tape 1X can be correctly reproduced and supplied as the output signal S8.

The write address signal S4 supplied by the error detection and data separation circuit 16 and the read address signal S5 supplied by the read address generation circuit 18 are also passed through a parallel/serial converter circuit 26 and supplied to a scanning locus evaluation circuit proper 27 as an evaluation input signal S11. The parallel/serial converter circuit 26 and the scanning locus evaluation circuit proper 27 together constitute a scanning locus evaluation circuit 25.

Figure 8:
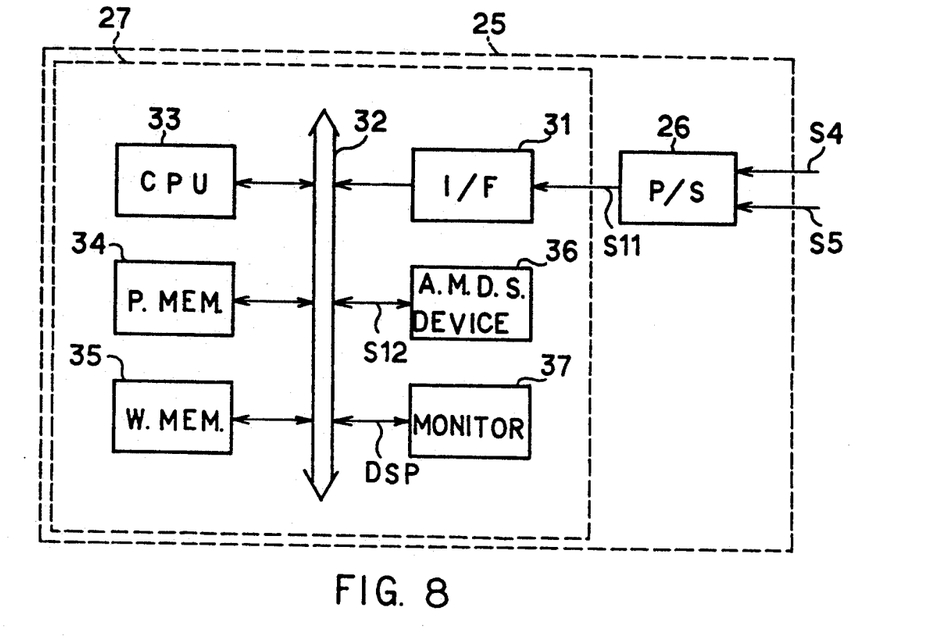
FIG. 8 is a block diagram showing a detailed structure of a scanning locus evaluation circuit 25 shown in FIG. 4.

As FIG. 8 shows, the scanning locus evaluation circuit proper 27 takes the evaluation input signal S11 into a CPU 33 through an interface circuit 31 and a bus 32.

In accordance with a program stored in a program memory 34 structured as a ROM circuit, the CPU 33 stores address map data S12 in an address map data storage device 36 utilizing a work memory 35 having a RAM structure. The address map data S12 thus stored in the address map data storage device 36 is transferred with predetermined timing to a monitor 37 as a display signal DSP. The address positions correctly detected by the rotary magnetic heads 12A and 12B are thereby displayed as a two-dimensionally developed map over the surface of the magnetic tape 1X.

Figure 9:
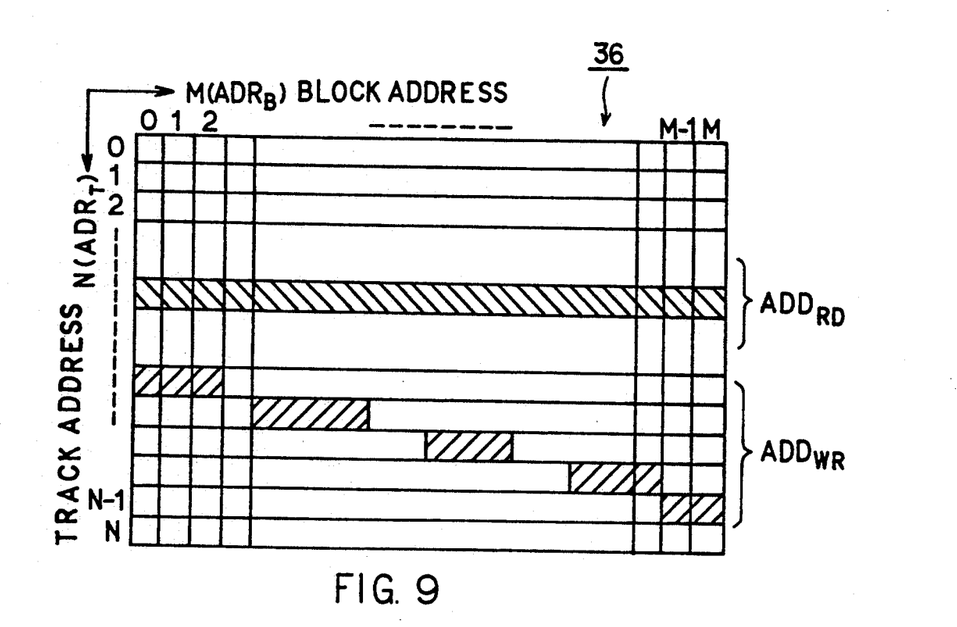
FIG. 9 is a diagram showing address map data in an address map data storage device 36 employed in the apparatus of FIG. 8.

As FIG. 9 shows, the address nap data storage device 36 has track addresses n and block addresses m corresponding to the track addresses n and block addresses m of the temporary memory 17. The address map data storage device 36 generates, as the address map data S12 of FIG. 8, a set of map data formed by using the track addresses n and the block addresses m of the blocks BLK, whose block data $D_{BLK}$ are correctly reproduced, as first and second map position specifying information $ADR_T$ and $ADR_B$ and adding the value "1" to the data at positions corresponding to the blocks BLK which have been correctly reproduced.

The address map data storage device 36 is set in advance so that values "0" are in all the map positions thereof. Map data indicating the number of times of correct reproduction of the block data in each map position is accumulated in the address nap data storage device 36. Map data in the reap positions where the block data has not been correctly reproduced even once is left at the value "0".

Thus, a set of map data including information as to how many times the rotary heads 12A and 12B have been able to correctly reproduce the block data at each address is produced in the address map data storage device 36.

In response to the group of the address map data thus produced during one scanning period $T_{SCN}$, the CPU 33 performs calculation on track address data $ADRR_T$ in the read address signal S5 supplied by the read address generation circuit 18 and track address data $ADRW_T$ in the write address signal S4 supplied by the error detection and data separation circuit 16. The calculation is $$DSP = ADRR_T - ADRW_T \qquad \ldots (1)$$

for each block address m(= "0" to "M") of each block address data $ADRW_B$. The work memory 35 receives and retains the results of the calculation.

Information of the display data DSP indicative of the difference values of the track addresses expressed by expression (1) and the addresses $ADRW_B$ indicates positional shift on the magnetic tape of the scanning locus HED up to the point currently scanned by the rotary magnetic heads 12A and 12B, referenced from the recording track corresponding to the information data correctly read out from the temporary memory 17. The display data DSP is not calculated for the track and block where the block data was not correctly reproduced by the rotary magnetic heads 12A and 12B.

After performing the calculation described above, the CPU 33 displays, on the basis of the display data DSP and the write block address $ADRW_B$, a scanning locus display pattern PT1 as shown in FIG. 7 on the monitor 37. The display pattern PT1 is graduated for the block addresses m(= "0", "1", ..., "M") in the horizontal direction and graduated for the difference values p of the display data DSP in the vertical direction.

Figure 10:
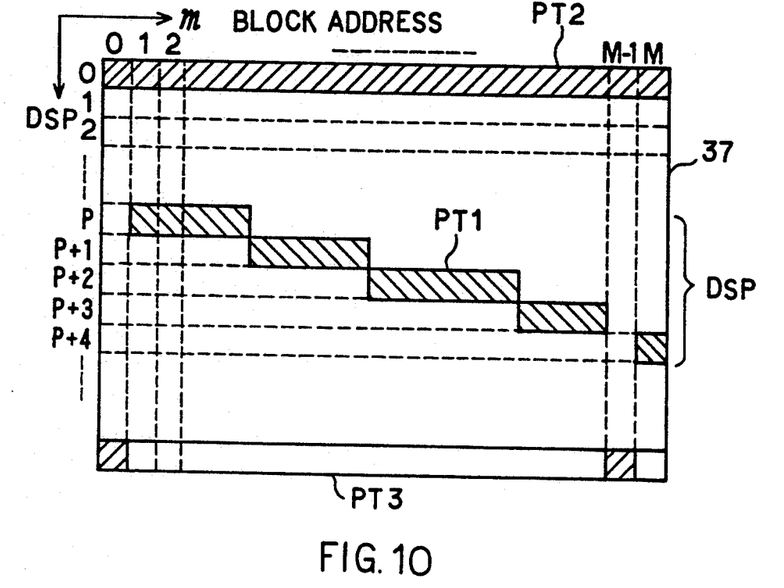
FIG. 10 and FIG. 11 are front elevational views showing examples of a display on a monitor 37 shown in FIG. 8.

In the embodiment of the invention shown in FIG. 10, when the scanning locus display pattern PT1 lacks some display data at certain block addresses m, the lacking data are displayed in a horizontally extending missing-data display pattern PT3 in the bottommost row on the monitor 37. This makes dropouts occurring in the display data easier to find.

With the described arrangement, when it is attempted to inspect a rotary head type recording and reproducing apparatus of the non-tracking system described above with reference to FIG. 3, a magnetic tape 1X for evaluation as shown in FIG. 5 is run in the reproducing mode so that a scanning locus HED is traced intersecting plural recording tracks 3.

The track addresses n constituting the write address signal S4 supplied by the error detection and data separation circuit 16 are shifted every time the scanning locus HED crosses over a track during one scan. The address nap data representing the shifted states is stored in the address map data storage device 36.

The address map data stored in the address map data storage device 36 represents a two-dimensional distribution, on the magnetic tape 1X, of track addresses n and block addresses m whose block data $D_{BLK}$ have been correctly reproduced, out of all the blocks BLK formed on the recording tracks 3, connected with one another, by the rotary magnetic heads 12A and 12B. This also represents the track addresses n and block addresses m which have not been correctly reproduced.

Therefore, the address map data stored in the address map data storage device 36 includes the conditions of the rotary magnetic heads 12A and 12B scanning the magnetic tape 1, i.e., the contacting condition of the rotary magnetic heads, the width of contact of the rotary magnetic heads, the inclination of the scanning locus with respect to the recording track, the performance of the reproducing servo, the error rate of reproduced data, etc. By using such pieces of information, whether the tape path system is "good" or "bad" can be judged for sure.

As FIG. 10 shows, the address map data stored in the address nap data storage device 36 of FIG. 8 is displayed as the scanning locus display pattern PT1 and the address lack or missing-data display pattern PT3 referenced from the read address display pattern PT2. The display patterns are developed two-dimensionally over the display screen of the monitor 37.

By virtue of this arrangement, when the scanning locus display pattern PT1 moves away from the read address display pattern PT2 as the block address m increases (m = "0", "1", "2", ..., "M"), it is known that the scanning locus HED of the rotary magnetic heads 12A and 12B with respect to the magnetic tape 1X in the reproducing mode rises toward the lateral direction of the magnetic tape 1X (the scanning condition shown in FIG. 3B. In addition, it is known that the larger the angle of inclination of the scanning locus display pattern PT1 becomes, the larger the degree of rise of the scanning locus HED is.

Conversely, when the change of the scanning locus display pattern PT1 shows an inclination opposite to that in FIG. 3B, it is known that the scanning condition is as described above with reference to FIG. 3A.

Therefore, the operating conditions of the tape path system can be positively distinguished by the displayed position of the scanning locus display pattern PT1.

Further, the missing address display pattern PT3 displayed on the monitor 37 makes it easy to detect. the position in the scanning locus display pattern PT1, in terms of the block address m, corresponding to the position on the recording track 3 of the block data that cannot be correctly reproduced.

Therefore, if the positions of the block address indicated by the missing address display pattern PT3 are the same through some repeated scans performed by the rotary magnetic heads 12A and 12B, it can be simply determined that the contacting condition of the rotary magnetic heads 12A and 12B with respect to the magnetic tape 1 is abnormal at the position on the scanning locus HED corresponding to the missing address position.

In making such an evaluation, it is not necessary to form a correct record pattern on the tape 1X for evaluation. Evaluations of sufficient accuracy can be obtained even if a relatively incorrect record pattern is used.

For example, even if a tape with a record pattern recorded thereon by the use of an unadjusted recording and reproducing apparatus is to be inspected and evaluated, information for evaluation can be read out in proper quantities by controlling the rotary magnetic heads in accordance with a non-tracking system. In contrast with the adjustment methods in a conventional digital audio tape recorder (DAT) or video tape recorder (VTR), etc., which require a correct record pattern, the present system can provide means for much simpler evaluation.

Figure 11:
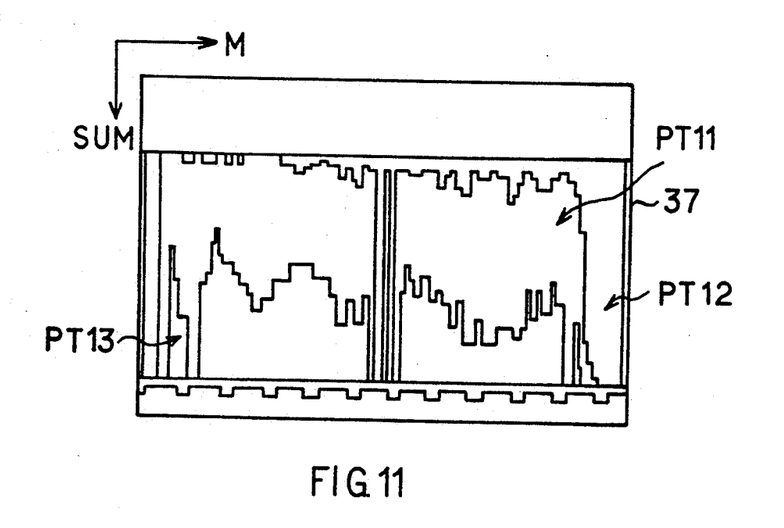

FIG. 11 shows another example of a display on the monitor 37. In this case, depending on the address map data stored in the address map data storage device 36, the CPU 33 can display the rate of occurrence of errors for each of the block data on the monitor 37 by accumulating for each block address the instances of normal reproduction and of dropouts of the block data through repeatedly traced scanning loci HED.

In FIG. 11, the axis of abscissae represents the block addresses m and the axis of ordinates represents the accumulated values (or rates of occurrence) SUM. The numbers of times at which the data could be read are displayed in the normal display area PT11, and the numbers of times at which data could not be read are displayed in the error display area PT12. In addition, the numbers of times at which data could be read more than once out of the addresses m included in the normal display area PT11 are displayed in the reference display area PT13.

By virtue of this arrangement, the distribution of the blocks in which errors are liable to occur can be easily determined in terms of the block addresses on the recording track 3.

2. Other Embodiments

1. In the embodiment of the invention described in detail above, the track addresses and the block addresses all over the recording tracks 3 are recorded as digital data. The same results can be obtained by recording an analog signal along the recording track 3. Digital data or analog signals representing block addresses are recorded together with the information signal.

Further, instead of recording the track addresses and block addresses all over the recording tracks 3, they can be recorded only at a portion thereof to determine whether the contact with the track is "good" or "bad" with respect to that portion.

2. In the embodiment of the invention described in detail above, a magnetic recording and reproducing apparatus using rotary magnetic heads is employed. The present invention can be widely applied, on the other hand, to non-magnetic recording systems, such, for example, as an optical recording and reproducing apparatus using rotary optical heads.

3. In the embodiment of the invention described in detail above, the information of the track addresses n and block address m is recorded together with the information data in preparing the tape 1X for evaluation. The same results can be obtained in accordance with the invention even if no information data is recorded.

4. In the embodiment of the invention described in detail above, as shown in FIG. 10 or FIG. 11, the block addresses m are represented by the axis of abscissae and the difference value p or accumulated values SUM for the track addresses are represented by the axis of ordinates on the display screen of the monitor 37. In accordance with the invention, however, other display formats involving, for example, an exchange the axes, i.e., an arrangement of the block addresses m along the axis of ordinates and an arrangement of the difference values p or accumulated values SUM along the axis of abscissae, can be used.

While the preferred embodiments of the invention have been described, it will be clear to those skilled in the art that various changes and modifications may be made therein without departing from the invention. The appended claims should therefore be construed as covering all such changes and modifications as fall within the spirit and scope of the invention.

We claim:

1. Apparatus for evaluating a scanning locus of a rotary head with respect to tracks recorded obliquely on a tape, the apparatus comprising:

rotary head type recording and reproducing means for recording tracks obliquely on a tape, the tracks being assigned respective track addresses and each track comprising a plurality of blocks assigned respective block addresses, and for reproducing the track and block address proper to each block;

detecting means responsive to the recording and reproducing means for indicating as to each track and block address whether or not there has been correct reproduction by the reproducing means;

address map data storage means responsive to the recording and reproducing means and the detecting means for storing the reproduced track and block addresses as respective first and second map position specifying data and for generating map information indicating the positions specified by the correctly reproduced track and block addresses and identifying any track and block addresses that have not been correctly reproduced; and evaluating means responsive to the address map data storage means for evaluating the scanning locus.

2. Apparatus according to claim 1 wherein the evaluating means comprises a display screen for displaying a pattern corresponding to said scanning locus.

3. Apparatus according to claim 1 wherein the evaluating means comprises a display screen for displaying a pattern corresponding to track and block addresses that have been incorrectly reproduced.

4. Apparatus according to claim 1 wherein the evaluating means comprises a display screen for displaying a pattern corresponding to said scanning locus and a pattern corresponding to track and block addresses that have been incorrectly reproduced.

5. Apparatus according to claim 1 wherein the evaluating means comprises a display screen for displaying a pattern corresponding to a rate of occurrence of errors as to each of the blocks.

6. Apparatus according to claim 1 for evaluating a scanning locus of a rotary head with respect to tracks recorded obliquely on a tape wherein the evaluating means comprises a display screen for displaying a pattern in which block addresses are represented by one of the axis of abscissae and the axis of ordinates and values corresponding to track addresses are represented by the other of the axis of abscissae and the axis of ordinates.

7. Apparatus according to claim 1 wherein the track and block addresses are recorded at least partially as digital data.

8. Apparatus according to claim 1 wherein the track and block addresses are recorded at least partially as analog data.

9. Apparatus according to claim 1 wherein the track and block addresses are recorded throughout the recorded tracks.

10. Apparatus according to claim 1 wherein the track and block addresses are recorded at selected portions of the recorded tracks.

11. Apparatus according to claim 1 wherein the recording and reproducing means comprises rotary magnetic heads.

12. Apparatus according to claim 1 wherein the recording and reproducing means comprises rotary optical heads.

13. Apparatus according to claim 1 wherein the recording and reproducing means records and reproduces information data in addition to the track and block addresses.

* * * * *